US008709573B2

(12) United States Patent
Hassan et al.

(10) Patent No.: US 8,709,573 B2
(45) Date of Patent: *Apr. 29, 2014

(54) POLYMER BONDED FIBROUS COATING ON DIPPED RUBBER ARTICLES SKIN CONTACTING EXTERNAL SURFACE

(75) Inventors: Noorman Bin Abu Hassan, Shah Alam (MY); David M. Lucas, Petaling Jaya Selangor (MY); Nuzaimah Binti Mustafa, Melaka (MY)

(73) Assignee: Ansell Healthcare Products LLC, Iselin, NJ (US)

( * ) Notice: Subject to any disclaimer, the term of this patent is extended or adjusted under 35 U.S.C. 154(b) by 655 days.

This patent is subject to a terminal disclaimer.

(21) Appl. No.: 12/408,336

(22) Filed: Mar. 20, 2009

(65) Prior Publication Data

US 2009/0188019 A1    Jul. 30, 2009

Related U.S. Application Data

(63) Continuation-in-part of application No. 10/741,413, filed on Dec. 19, 2003, now Pat. No. 7,037,579, and a continuation-in-part of application No. 11/355,325, filed on Feb. 16, 2006, now Pat. No. 7,527,828.

(51) Int. Cl.
*B32B 25/02* (2006.01)
*B05D 3/02* (2006.01)

(52) U.S. Cl.
USPC ......... 428/90; 428/95; 428/297.1; 428/300.7; 427/385.5; 427/407.1; 427/430.1

(58) Field of Classification Search
USPC .............. 428/90, 91, 95, 295.1, 297.1, 297.4, 428/300.7; 427/352, 180, 202, 206, 372.2, 427/384, 385.5, 402, 407.1, 412.1, 416, 427/430.1
See application file for complete search history.

(56) References Cited

U.S. PATENT DOCUMENTS

| 1,102,342 A | 7/1914 | Kendall |
| 2,120,722 A | 6/1938 | Tillotson |

(Continued)

FOREIGN PATENT DOCUMENTS

| EP | 0 128 531 A2 | 12/1984 |
| EP | 0 815 880 A2 | 1/1998 |

(Continued)

OTHER PUBLICATIONS

Supplementary European Search Report in Appln. No. 04821122.1, 10 pgs.

(Continued)

*Primary Examiner* — Cheryl Juska
(74) *Attorney, Agent, or Firm* — Moser Taboada

(57) ABSTRACT

A latex glove article with a fibrous coating bonded to the skin-contacting surface. Long length soft moisture absorbing fibers are attached to latex layer of a glove with a thin layer of polymeric latex adhesive forming a fibrous lining. The long length fibers extend or project from the polymeric latex adhesive coating. The fibers penetrate the polymeric latex adhesive layer at one end or both end of the fiber to a depth of about 60% to about 100% of the adhesive thickness, leaving a substantial portion of the fiber available for soft contact with skin and sweat absorption. Due to the substantial thickness of the fibrous lining, which is between about 4 and about 100 times the thickness of the thin layer of polymeric latex adhesive, an air gap is created between skin and the impervious latex layer establishing continual evaporation of absorbed sweat and evaporative cooling.

23 Claims, 3 Drawing Sheets

(56) References Cited

U.S. PATENT DOCUMENTS

| | | | |
|---|---|---|---|
| 2,916,036 A | | 12/1959 | Sutton |
| 3,095,755 A | | 7/1963 | Barth et al. |
| 3,535,192 A | * | 10/1970 | Gamble .................... 428/95 |
| 4,061,811 A | * | 12/1977 | Takase et al. .................... 428/95 |
| 4,519,098 A | * | 5/1985 | Dunmire et al. ............... 2/161.8 |
| 5,036,551 A | | 8/1991 | Dailey et al. |
| 5,486,322 A | | 1/1996 | Fuchs |
| 5,540,976 A | | 7/1996 | Shawver et al. |
| 5,581,812 A | * | 12/1996 | Krocheski .................... 2/167 |
| 5,742,943 A | | 4/1998 | Chen |
| 5,877,244 A | | 3/1999 | Hoover et al. |
| 5,997,969 A | | 12/1999 | Gardon |
| 6,019,922 A | * | 2/2000 | Hassan et al. ................ 264/130 |
| 6,021,524 A | * | 2/2000 | Wu et al. .................... 2/167 |
| 6,028,017 A | | 2/2000 | Curtin et al. |
| 6,096,668 A | | 8/2000 | Abuto et al. |
| 6,143,416 A | | 11/2000 | Brindle et al. |
| 7,037,579 B2 | * | 5/2006 | Hassan et al. ............. 428/295.1 |
| 7,378,043 B2 | * | 5/2008 | Hassan et al. .................. 264/28 |
| 7,527,828 B2 | * | 5/2009 | Hassan et al. ................ 427/352 |
| 7,814,570 B2 | * | 10/2010 | Hassan et al. ................ 2/161.1 |
| 7,891,022 B2 | * | 2/2011 | Hanada et al. .................... 2/159 |
| 7,897,236 B2 | * | 3/2011 | Merovitz ........................ 428/90 |
| RE43,172 E | * | 2/2012 | Wu et al. .......................... 2/167 |
| 2002/0066975 A1 | | 6/2002 | Elvig |
| 2005/0136236 A1 | * | 6/2005 | Hassan et al. .............. 428/297.1 |
| 2005/0183186 A1 | * | 8/2005 | Hanada et al. .................... 2/167 |
| 2006/0141165 A1 | * | 6/2006 | Hassan et al. ............... 427/430.1 |
| 2006/0150300 A1 | * | 7/2006 | Hassan et al. ................ 2/161.6 |
| 2007/0044201 A1 | * | 3/2007 | Morita et al. .................... 2/159 |
| 2008/0244809 A1 | * | 10/2008 | Hassan et al. ................ 2/161.8 |
| 2011/0088140 A1 | * | 4/2011 | Hassan et al. ................ 2/161.8 |
| 2011/0099689 A1 | * | 5/2011 | Taylor et al. .................... 2/167 |

FOREIGN PATENT DOCUMENTS

| | | |
|---|---|---|
| EP | 0 922 553 A2 | 6/1999 |
| JP | 59-230735 | 12/1984 |
| JP | H03-1034 | 1/1991 |
| JP | 6-146176 | 5/1994 |
| JP | 10-95867 | 4/1998 |
| JP | 10-099183 | 4/1998 |
| JP | 11-246695 | 9/1999 |
| JP | 2002-253417 | 9/2002 |
| WO | WO-96/23643 | 8/1996 |
| WO | WO-01/58656 A1 | 8/2001 |
| WO | WO 03/079872 | 10/2003 |
| WO | WO-2004/002252 | 1/2004 |

OTHER PUBLICATIONS

EPO Official Communication for EP Patent Application No. 04 821 122.1-2124 Dated Oct. 15, 2012, 6 Pages.

* cited by examiner

POLYMER BONDED FIBROUS COATING ON DIPPED RUBBER ARTICLES SKIN CONTACTING EXTERNAL SURFACE

STATEMENT OF RELATED CASES

This is a Continuation-In-Part of application Ser. No. 10/741,413, filed Dec. 19, 2003, now issued as U.S. Pat. No. 7,037,579 and Ser. No. 11/355,325, filed Feb. 16, 2006, the disclosures of which are hereby incorporated by reference in their entireties.

FIELD

The invention relates to elastomeric latex articles. More specifically, provided are latex articles having sweat managing fibrous coatings attached to the skin contacting external surface by a polymeric adhesive coating. This polymeric adhesive coating serves to attach the moisture absorbing fibers to the elastomeric article without covering the fibers. The polymeric adhesive coating can be foamed. The fibrous lining with unfoamed or foamed polymeric adhesive coating can be applied to gloves used in household or industrial applications.

BACKGROUND

A common method of coating household or industrial gloves is by flocking, or blowing natural cotton or synthetic fibers by using air or static discharge, onto a thickened dipped adhesive layer of polymer latex bonded to a first layer of another polymer latex gel. Other methods include mounting former-shaped woven fabric onto metal or ceramic formers and dipping polymer latex onto the woven-fabric layer. Unfortunately, these fibers are completely bonded along their entire length and are not free to absorb sweat.

For example, U.S. Pat. No. 3,098,755 to Bath et al. discloses coated rubber articles and method of producing the same. A flock layer is deposited by any suitable method, such as blowing or electrostatic deposition on the pre-polymer polyurethane coating prior to curing. The flock is impinged onto the pre-polymer polyurethane coating in such a way that mixing of the flock fibers with the polymer coating or embedding or full penetration of the fibers in the polymer coating is avoided. Thus, while the fibers may be oriented normal to the coating surface, or oriented in a different fashion, only the surface portion of the coating engages the fibers.

A modification of the flocking technique is described in GB Patent No. 1,102,342, which includes a non-dipping process for manufacture of elongated binder particles of polymeric materials. The process is performed by adding natural or synthetic fibers into a dispersion of polymeric materials, freezing the aqueous dispersion of the polymeric material, and thawing the frozen dispersion to obtain particles of the polymeric material. The particles of polymeric material then bind the natural or synthetic fibers together against a porous surface when suction is applied. The porous surface is a papermaking screen and the fibrous web formed is then pressed and calendared.

U.S. Pat. No. 6,143,416 to Brindle et al. discloses polyurethane thin-walled articles with a rough surface, and method of producing the same. The thin walled article is a surgical glove. The glove includes a first elastomer layer of polyurethane formed by dip coating using a rough-surfaced former to provide outer surface grip for the glove. There are no fibers on the skin-contacting surface of the surgical glove.

U.S. Pat. No. 6,021,524 to Wu et al. discloses cut resistant polymeric films. This cut resistant polymeric comprises a central polymeric matrix dispersed with a plurality of cut resistant fibers including glass fibers, steel fibers, aramid fibers, polyethylene fibers, particle filled polymeric fibers. The inner and outer layers of the medical or industrial glove article do not contain any cut resistant fibers. The fibers used are not moisture absorbing fibers and they are entirely contained in the middle layer and any exposure to these fibers can irritate or cut skin on contact.

GB 1091523 to Haughton discloses composite flock-coated mats. The steps of the method include: coating the surface of a flexible base sheet with a curable natural or synthetic rubber latex adhesive, electrostatically depositing flock on the adhesive, drying the adhesive with flock, placing the flock-coated section on an electrically-heated vacuum mold and applying vacuum so that the section is drawn into position, curing the base sheet and adhesive with flock. The flock is only attached to the surface of the adhesive coating. A flock-coated section may be attached to a molded mat. This mat with flock is not a flexible latex article such as a glove.

Published U.S. Patent No. 20050136236 to Hassan et al. discloses polymer composite fibrous coating on dipped rubber articles and method. The invention provides an elastomeric article having a first layer comprising a natural or synthetic polymer; and a second layer bonded to the first layer that comprises a polymer composite fibrous coating. The polymer composite fibrous coating includes at least one elastomer or elastomer blend, a fiber or fiber blend, a surfactant, and a micronized wax. The coating can be foamed, and provides improved sweat management and non-shredding properties to a user. There is no reference to the depth of penetration of fibers in the fibrous coating and there is no indication that these fibers are retained when wet or the glove with composite fibrous coating is washable.

It is common for a wearer of industrial or household gloves to experience excessive sweat soaking. Thus, industrial or household gloves are typically less comfortable when worn for longer periods of time especially when currently available unflocked bare gloves are used. To combat this sweating problem, flock-lined gloves are in the market. Although flock-lined gloves provide better surface comfort than unflocked gloves, the sweat absorption by and evaporation from this type of glove is still relatively poor since the flock lining is flat against the latex surface. Additionally, flock coverage is sometimes inconsistent in conventional flock linings.

Accordingly, it is desirable to have a latex glove article with a skin contacting surface that has a fibrous lining or coating, which is not completely flattened against the latex surface and is firmly attached to the latex surface thereby cooling the user's hand through evaporation. The fibrous coating is able to absorb and retain the moisture while evaporation cools the wearer's hand while at the same time the hand is kept dry. Therefore, a glove with non-flattened fibrous lining is needed for household or industrial applications providing increased comfort level with respect to sweat management within a glove.

SUMMARY

A thin layer of polymeric latex adhesive securely attaches plurality of long length moisture absorbing fibers to the skin-contacting surface of a latex glove article forming a fibrous lining that provides sweat management properties. These long length fibers are attached to the latex layer interior surface by a thin layer of polymeric latex adhesive, securing only one tip or simultaneously both tips of the fiber. The end of the fiber penetrates a significant portion, typically in the range of 60% to 100% of the thickness of the polymeric latex adhesive layer providing secure attachment of these sweat management fibers. The fibrous coating is therefore essentially non-shredding even when it is rubbed when wet, allowing safe use of these fiber-lined gloves in food handling industry. The glove with the fiber lining can be washed in a commercial washing machine without loss of fibers due to the penetration of the fibers into the polymeric latex adhesive layer. This geometrical arrangement of fiber attachment provides unique benefits to the glove since the long length fiber extend or project from the latex glove surface to a distance nearly equivalent to or greater than the thickness of the glove's latex layer. An air gap is therefore formed between the latex layer of the glove and the skin, permitting air movement, which results in the evaporation of sweat-generated moisture. The heat of evaporation of sweat generated moisture results in evaporative cooling keeping the skin cool and comfortable. The evaporation process also dries the fibers regenerating some of the moisture absorption capability of the fibers.

The first glove base latex layer and/or the second latex adhesive layer securing the fibers of the glove can be made from a number of polymeric latex materials including but not limited to natural rubber, synthetic polyisoprene, styrene-butadiene, carboxylated or non-carboxylated acrylonitrile-butadiene, polychloroprene, polyacrylic, butyl rubber, or polyurethane (polyester based or polyether based), or combinations thereof.

The long length fiber of some aspects is soft in order to provide comfortable feel against skin surface and may be moisture absorbing. Suitable fibers include but are not limited to natural or synthetic fibers, such as wool, cotton, jute, rayon, polyamide, polyesters or acrylics.

In addition to the fiber lining, the skin-contacting surface of some aspects may contain one or more micronized waxes to enhance the donning properties of the glove. The micronized wax of some aspects is selected from the group consisting of synthetic wax, natural wax and mixtures thereof. Suitable micronized waxes include, but are not limited to, carnauba wax, microcrystalline wax, paraffin wax, polyethylene wax, oxidized polyethylene wax, modified polyethylene wax, high-density polyethylene ("HDPE"), oxidized high-density polyethylene wax, modified high-density polyethylene wax, polypropylene wax, polyamide wax, polytetrafluoroethylene ("PTFE"), or mixtures thereof. In a specific embodiment of the invention, the micronized wax is high-density polyethylene wax.

The micronized wax of some aspects of the invention has a particle size in the range of about 1 µm to about 20 µm. The micronized wax of detailed embodiments has a particle size in the range of about 3 µm to about 12 µm. The micronized wax of other detailed embodiments has a particle size greater than about 1 µm, 2 µm, 3 µm, 4 µm or 5 µm. The micronized wax of more detailed embodiments has a particle size less than about 20 µm, 15 µm, 12, µm or 10 µm.

The thin polymeric latex adhesive layer that attaches the fibers to the latex layer of the glove may be solid or foamed. The foamed layer provides additional cushioning and also provides additional sweat or moisture absorption capability especially when the foam is open-celled.

Typical dimension of the latex layer of the glove is in the range of 8 mil to 16 mil (0.2 to 0.4 mm). The thin polymeric adhesive layer is typically only 1 mil to 1.5 mil thick (0.02 to 0.03 mm). However, the length of the long length fibers is typically in the range of 4 mil to 78 mil (0.1 mm to 2 mm). The long length fibers typically have a denier ranging from about 1.0 to about 2.0. When these fibers are locked in the thin polymeric adhesive layer, the fibers penetrate to a depth within 60% to 100% of the polymeric adhesive layer thickness providing secure adhesion of the fibers. The remaining length of the fiber is external to the polymeric adhesive layer surface and is therefore available for sweat absorption. The fibrous lining has a thickness typically in the range of 0.2 to 0.5 times the thickness of the latex layer of the glove with the extended fibers bent over each other.

The latex glove with a fibrous lining is suitable for an industrial glove or a surgical glove.

Creation of this sweat absorbing non-shredding fibrous lining on the interior skin-contacting surface of a latex glove that can withstand laundering requires a processing method with carefully controlled specialized processing steps. Exemplary examples of fiber-lined gloves are disclosed.

DETAILED DESCRIPTION

Figure 1:
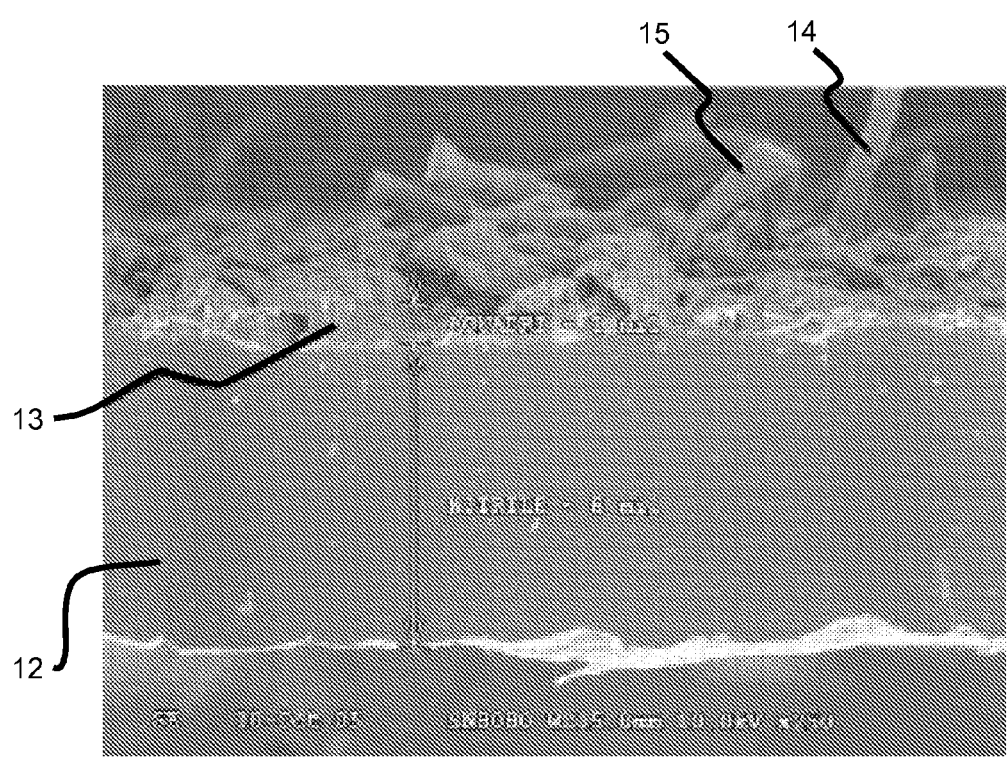
FIG. 1 shows a scanning electron photomicrograph of a side view of a latex layer with fibers extending or projecting from the latex surface bonded with a polymeric latex adhesive layer at 250× in one embodiment of the present invention.

One or more aspects of the present invention are directed to an elastomeric article comprising a first polymeric glove base latex layer and a second polymeric latex adhesive layer securing the fibers. Aspects of the invention include a non-shedding or non-linting fibrous lining on the interior latex surface of a glove, suitable for use in applications such as food processing, where fiber shedding and product contamination are unacceptable. There is provided an elastomeric article such as a glove with improved sweat management properties and non-shedding fibrous linings. These sweat absorbing long length fibers, which have two ends, are attached to the interior latex surface of the glove by a thin layer of polymeric latex adhesive wherein at least one of the ends of the long length fiber penetrates substantially the thickness of the polymeric latex adhesive layer thereby providing secure attachment of the sweat absorbing fibers. The long length fibers therefore extend or project from the latex glove surface to an extent nearly equal to or greater than the thickness of the latex layer of the glove providing comfortable glove feel and sweat management properties. Due to the increased thickness of the fibrous lining, air movement is possible in the region between skin and the latex surface allowing evaporation of sweat-generated moisture, resulting in evaporative cooling. This evaporation cools the skin and regenerates some of the sweat absorption capability of the fibrous lining. The fibrous lining is resistant to shedding when wet or dry.

The first polymeric glove base latex layer of some aspects has a thickness in the range of about 4 mil to about 32 mil (about 0.1 to about 0.8 mm). In other detailed embodiments the first latex layer has a thickness in the range of about 8 mil to about 24 mil (about 0.2 to about 0.6 mm). In other detailed embodiments, the first latex layer has a thickness in the range of about 8 mil to about 16 mil (about 0.2 to about 0.4 mm). In other specific embodiments, the first latex layer has a thickness greater than about 4 mils, 8 mils, 10 mils, or 12 mils. In further specific embodiments, the first latex layer has a thickness less than about 32 mil, 24 mil, 20 mil, 16 mil or 12 mil. Some additional specific embodiments include combinations of the minimum and maximum thicknesses described.

The second polymeric latex adhesive layer securing the fibers of some aspects has a thickness in the range of about 0.25 mil to about 2.5 mil (about 0.005 to about 0.06 mm). The thickness of the second polymeric latex adhesive layer of other embodiments is in the range of about 1 mil to about 1.5 mil thick (0.02 to 0.03 mm). According to some detailed embodiments, the second polymeric latex adhesive layer has a thickness greater than about 0.25 mil, 0.5 mil, 0.75 mil, 1.0 mil, 1.25 mil or 1.5 mil. According to other detailed embodiments, the second polymeric latex adhesive layer has a thickness less than about 2.5 mil, 2 mil, 1.5 mil or 1 mil. Some additional specific embodiments include combinations of the minimum and maximum thicknesses described.

The length of the long length fibers of some aspects of the invention is in the range of about 2 mil to about 200 mil (about 0.05 to about 5 mm). According to other embodiments, the fibers have a length in the range of about 4 mil to about 100 mil (about 0.1 to about 2.5 mm). In some detailed embodiments, the fibers have a length greater than about 2 mil, 3 mil, 4 mil, 5 mil, 6 mil, 7 mil, 8 mil, 9 mil or 10 mil. is typically in the range of 4 mil to 78 mil (0.1 mm to 2 mm). Some additional specific embodiments include combinations of the minimum and maximum lengths described.

The denier of the fibers according to one or more embodiments ranges from about 0.5 to about 4.0. The denier of other embodiments ranges from about 1 to about 2. Specific embodiments have a denier greater than about 0.5, 0.75 or 1. Other specific embodiments have a denier less than about 4, 3 or 2. Some additional specific embodiments include combinations of the minimum and maximum deniers described.

The fibers of some embodiments penetrate the second polymeric latex adhesive layer to a depth in the range of about 20% to about 100% of the thickness of the layer. Other embodiments have the fibers penetrating the second polymeric latex adhesive layer to a depth in the range of about 60% to about 100% of the thickness of the layer. In other detailed embodiments, the fibers penetrate to a depth greater than about 20%, 30%, 40%, 50%, 60% or 70% of the thickness of the layer. The remaining length of the fiber is external to the polymeric adhesive layer surface and is therefore available for sweat absorption. The fibrous lining of some aspects has a thickness in the range of about 0.1 to 1.0 times the thickness of the latex layer of the glove with the extended fibers bent over each other. In other embodiments, the fibrous lining has a thickness in the range of about 0.2 to about 0.5 times the thickness of the latex layer of the glove. The fibrous lining of detailed embodiments has a thickness of about 2 to about 150 times the thickness of the second polymeric latex adhesive layer. In other detailed embodiments, the thickness is between about 4 and about 100 times the thickness of the second layer.

According to some embodiments, one end of the fibers penetrate the second polymeric latex adhesive layer, leaving the other end extending from the second layer. In other embodiments, both ends of the fibers penetrate the second polymeric latex adhesive layer, leaving the central portion of the fiber protruding from the second layer. Further embodiments exhibit a combination of single ended and double ended penetration of the fibers into the second layer.

In order for the fibers to be distributed individually and bonded to the latex layer of the glove, a carefully controlled specialized process is employed. In step 1, the latex layer of the glove is prepared by dipping a coagulant coated former in the shape of a human hand in an aqueous latex emulsion, which comprises water, polymeric latex, cross linking agents, curatives, stabilizers, viscosity modifiers, thickeners, surfactants and the like. The coagulant destabilizes the aqueous latex emulsion in the neighborhood of the former surface, gelling the latex emulsion and forming the latex layer of the glove. At this stage, the latex layer is uncured, meaning that the rubber chain is not cross-linked. Typical thickness of this latex layer is 8 mil to 16 mil (0.2 mm to 0.4 mm). The former with the latex layer is first air dried and then taken to a separate dip station which has long length fibers dispersed in a dilute polymeric latex adhesive emulsion. The fibrous lining coated glove is dried and cured to crosslink the latex and the adhesive layer. Due to the dilution of the polymer in the adhesive layer, the polymer migrates to the base layer latex during the drying and curing operation resulting in a concentrated polymer adhesive composition that cures to create bond between one or two ends of the fiber to the base latex layer of the glove. The unbonded portion of the fiber is creating a fibrous lining with fibers that extend from the latex layer and are bonded thereto by a polymeric latex adhesive layer.

Fibers are commonly available as flocks and individual fibers need to be separated from each other to produce the desired fibrous lining. Fibers that are soft and provide moisture absorption include natural or synthetic fibers, such as wool, cotton, jute, rayon, polyamide, polyesters or acrylics. The length of the long length fibers is typically in the range of 4 mil to 78 mil (0.1 mm to 2 mm). The long length fibers typically have a denier ranging from about 1.0 to about 2.0. When these long length fibers are dispersed in water, the flocks do not normally separate into individual fibers, or have a tendency to settle down. Limiting the quantity of flock and adding a surfactant to the water allows the flock of fibers to disperse into individual fibers and prevents settling of the fibers. Surfactants that provide this functionality include ethoxylated acetylenic diol, triethanolamine. Another group of suitable surfactants in combination with triethanolamine suitable to wet cotton/rayon fibers include the anionic surfactants containing alkyl, alkenyl, aralkyl and aryl group with at least one lipophilic moiety (for example one of said group of for example 8 to 18 carbon atoms) and a salted acid group, for example a carboxylic, sulphonic, phophoric, phosphonic or like acid group. Any counter ion present will be skin compatible, for example an alkali metal ion such as sodium or potassium of which sodium is preferred.

Other suitable anionic surfactants include alkyl and alkenyl sulphates for example those wherein the lipophilic moiety has 12 to 18 carbon atoms. An example of a common anionic surfactant is sodium lauryl sulphate.

Suitable non-ionic surfactants used in combination with triethanolamine include those containing residues of ethylene oxide, for example polyethoxylated fatty alcohols, polymers of ethylene oxide and copolymers of ethylene oxide and propylene oxide. Suitable polyethoxylated fatty acids include those where an alkyl, alkelyl group of 8 to 18 carbon atoms or a sorbitan or similar group carry from 1 to 10, usually 2 to 8 polyoxyethylene residues wherein the polyoxyethylene residue has about 15 to 80 oxyethylene groups. Such materials are available commercially under trade names such as TWEEN, BRIJ, SPA, GENEROL, TERGITOL, MYRJ, ALGENE and TRITON. Suitable surfactant polymers of ethylene oxide and propylene oxide are generally block copolymers and are also commercially available, for example under trade names PLURONIC, TERGITOL, BRIJ and GENEROL.

Exemplary examples of dispersing a flock of fibers in water containing additives is shown below. Percentages represent dry weight of a given component based on the total weight of an aqueous solution.

EXAMPLE 1

Cotton flock was dispersed into an aqueous solution using a high-speed SILVERSON mixer model No. L4R. The following cotton flock dispersion was prepared:

| | |
|---|---|
| Sieved cotton flock | 1.0% |
| Ethoxylated acetylenic diol surfactant | 0.18% |
| Triethanolamine | 0.18% |
| Water | 98.64% |

The cotton flock was sieved before adding into the mixture of water and surfactant to ensure no agglomeration of flock before addition. A stable and uniform dispersion was achieved.

EXAMPLE 2

Cotton flock was dispersed into an aqueous solution as in Example 1. Again, a stable and uniform dispersion was achieved.

| | |
|---|---|
| Sieved cotton flock | 2.0% |
| Ethoxylated acetylenic diol surfactant | 0.18% |
| Triethanolamine | 0.18% |
| Water | 97.64% |

EXAMPLE 3

Cotton flock was dispersed into an aqueous solution as in Example 1.

| | |
|---|---|
| Sieved cotton flock | 5.0% |
| Ethoxylated acetylenic diol surfactant | 0.18% |
| Triethanolamine | 0.18% |
| Water | 94.64% |

After approximately 50% of the amount of sieved flock was already dispersed, further flock addition caused the flock in the dispersion to swell and caused flock agglomeration and destabilization.

EXAMPLE 4

Cotton flock was dispersed into an aqueous solution as in Example 1.

| | |
|---|---|
| Sieved cotton flock | 5.0% |
| Ethoxylated acetylenic diol surfactant | 0.72% |
| Triethanolamine | 0.72% |
| Water | 93.56% |

Flock agglomeration and destabilization were observed, as in Example 3.

From these examples it is clear that fiber agglomeration and destabilization can be avoided by controlling the amount of flock and the amount of surfactants.

It is desirable to add a micronized wax to the fiber dispersion since superior donning properties of the fiber-lined glove is observed. The next set of examples indicates the use of micronized wax in the aqueous dispersion.

EXAMPLE 5

Cotton flock was dispersed into an aqueous solution as in Example 2. Micronized high-density polyethylene wax was added prior to adding the cotton flock.

| | |
|---|---|
| Sieved cotton flock | 2.0% |
| Micronized HDPE wax | 1.0% |
| Ethoxylated acetylenic diol surfactant | 0.40% |
| Triethanolamine | 0.40% |
| Water | 96.20% |

A stable dispersion was obtained with no sign of agglomeration on normal stirring.

EXAMPLE 6

Cotton flock was dispersed into an aqueous solution as in Example 5.

| | |
|---|---|
| Sieved cotton flock | 3.0% |
| Micronized HDPE wax | 1.0% |
| Ethoxylated acetylenic diol surfactant | 0.40% |
| Triethanolamine | 0.40% |
| Water | 95.20% |

All of the sieved flock was uniformly dispersed on mixing with normal stirring, and there was no agglomeration. A stable flock dispersion was obtained.

For this fiber containing aqueous dispersion to function as polymeric latex adhesive with a thin adhesive layer, a dilute emulsion of polymer latex needs to be added to the stable aqueous fiber dispersion.

The former with uncured latex gel from step 1 is dipped into the dilute emulsion of polymeric latex adhesive with suspended fibers to form a fibrous layer. Both the latex layer and the fibrous layer are cured together at a temperature between about 120° C. and about 160° C. for about 40 minutes. During curing, the polymeric adhesive migrates to the uncured latex gel and produces a concentrated polymeric adhesive creating a bond between the latex layer and the thin adhesive layer. The thickness of the polymeric latex adhesive layer is typically small in the range of about 0.25 to about 1.5 mil (0.005 to 0.03 mm) due to the dilution of the polymeric latex adhesive. Since the length of the fibers is in the range of about 4 mil to about 78 mil (0.1 mm to 2 mm), the polymeric latex adhesive runs down the fiber and dries at the latex layer interface during cure, resulting in the tip or tips of the fibers being embedded in the polymeric latex adhesive layer. This results in the secure attachment of the fiber to the cured latex, while major portions of the long length fiber extends or projects from the latex surface.

A number of combinations of polymer latex adhesives are added to the stable aqueous fiber suspension and the property of fiber lined latex glove is evaluated.

EXAMPLE 7

The salt-based coagulant was prepared by adding the components to water in the following order.

| | |
|---|---|
| Calcium nitrate | 15.0% |
| PEG 3350 | 0.5% |
| S 465 | 0.3% |
| CELLOSIZE | 0.2% |
| Ethyl lactate | 0.6% |
| Ethyl alcohol, denatured | 5.02% |
| Water | balance |

The coagulant mixture was stirred until foam collapsed.

EXAMPLE 8

The following carboxylated acrylonitrile-butadiene latex was prepared for step 1 of the process.

| | |
|---|---|
| PERBUNAN X1171 | 35.7% |
| COMPOSITE A345 | 1.78% |
| SCRIPSET 550 | 0.36% |
| WEBNIX FREESIL N | 0.22% |
| NIPACIDE TK | 0.21% |
| Titanium dioxide | 0.18% |
| Potassium hydroxide | to pH 9-9.5 |

EXAMPLE 9

A ceramic textured glove former was heated to about 60-70° C. and then dipped into a coagulant bath heated to about 40-50° C. as in Example 7. After drying the salt deposits on the former, the former was then dipped into a carboxylated acrylonitrile-butadiene latex dispersion as in Example 8 to complete step 1. The former was then placed in an oven for about 60 seconds at about 90° C. to dry up the latex gels. Then the former was dipped into the following polymeric latex adhesive with stable fiber dispersion. The polymer adhesive dispersion looks viscous and is saturated with flock. The flock dispersion was prepared as in Example 6, except that the polyurethane latex (NEOREZ R-987) and small quantity of acrylonitrile-butadiene latex compound of Example 8 were added in with stirring.

| | |
|---|---|
| Example 8 latex compound | 6.66% |
| NEOREZ R-987 | 3.33% |
| Sieved cotton flock | 3.00% |
| Micronized HDPE wax | 1.00% |
| Surfactants | as in Example 6 |
| Water | balance |

A uniform coating was achieved on the elastomer gels and was dried for about 120 seconds at about 80-90° C. before it was leached with hot water for about 4 minutes at about 40-50° C. The glove was then cured for about 40 minutes at about 120° C. The finished glove was wet-stripped after post-leaching.

EXAMPLE 10

The procedure of Example 9 was repeated, except that the flock dispersion was prepared according to Example 5 and the polymeric latex adhesive with fiber dispersion was prepared as below.

| | |
|---|---|
| Example 8 latex compound | 5.00% |
| NEOREZ R-987 | 2.50% |
| Sieved cotton flock | 2.00% |
| Micronized HDPE wax | 1.00% |
| Surfactants | as in Example 5 |
| Water | balance |

The glove after donning for a period of 1 hour still feels comfortable and dry.

EXAMPLE 11

The procedure of Example 9 was repeated using the following polymeric latex adhesive with fiber dispersion:

| | |
|---|---|
| Example 8 | 5.00% |
| NEOREZ R-987 | 2.50% |
| Sieved cotton flock | 2.00% |
| Rayon flock | 2.00% |
| Micronized HDPE wax | 1.00% |
| Ethoxylated acetylenic diol surfactant | 0.40% |
| Triethanolamine | 0.40% |
| Water | balance |

The glove after donning for a period of 1 hour feels drier than Example 10.

EXAMPLE 12

The procedure of Example 9 was repeated using the following polymeric latex adhesive with fiber dispersion:

| | |
|---|---|
| NEOREZ R-987 | 10.0% |
| Sieved cotton flock | 2.00% |
| Rayon flock | 2.00% |
| Micronized HDPE wax | 0.80% |
| Ethoxylated acetylenic diol surfactant | 0.40% |
| Triethanolamine | 0.40% |
| Water | balance |

The applied coating was fibrous and smooth.

EXAMPLE 13

The procedure of Example 9 was repeated using the following polymeric latex adhesive with fiber dispersion:

| | |
|---|---|
| NEOREZ R-987 | 7.50% |
| Sieved cotton flock | 2.00% |
| Rayon flock | 1.00% |
| Micronized HDPE wax | 0.80% |
| Ethoxylated acetylenic diol surfactant | 0.40% |
| Triethanolamine | 0.40% |
| Water | balance |

The applied coating was fibrous and smooth.

EXAMPLE 14

The procedure of Example 9 was repeated using the following polymeric latex adhesive with fiber dispersion. The polymeric latex adhesive with fiber dispersion mix was thickened to increase the pickup during dipping. The thickener was added after all the other ingredients were already dispersed.

The viscosity of the thickened polymeric latex adhesive with fiber dispersion (Brookfield model LVT, spindle #1 @ 60 rpm) was 70 cps.

| | |
|---|---|
| NEOREZ R-987 | 5.00% |
| ACRYSOL G 111 thickener | 0.10% |
| Sieved cotton flock | 2.00% |
| Rayon flock | 1.00% |
| Micronized HDPE wax | 0.80% |
| Ethoxylated acetylenic diol surfactant | 0.40% |
| Triethanolamine | 0.40% |
| Water | balance |

The glove is more comfortable than Example 11 when donning for a period of 1 hour.

EXAMPLE 15

The procedure of Example 14 was repeated using the following polymeric latex adhesive with fiber dispersion:

| | |
|---|---|
| NEOREZ R-987 | 3.50% |
| ACRYSOL G 111 thickener | 0.40% |
| Sieved cotton flock | 2.00% |
| Rayon flock | 1.00% |
| Micronized HDPE wax | 0.80% |
| Ethoxylated acetylenic diol surfactant | 0.40% |
| Triethanolamine | 0.40% |
| Water | balance |

This glove is comfortable to don for a period of 1 hour and the user's hand still feels dry after this period. However, the coated laminate is less fibrous than Example 14.

Next, the polymeric adhesive layer was foamed to create a cushioned attachment of the fibers to the latex layer as detailed in the examples below.

EXAMPLE 16

The procedure of Example 9 was repeated, except the elastomeric gel layer was dipped into a standard typical foam mix as detailed, followed by brief drying of the gel for about 5 minutes at about 40° C. This step was then followed by a 5% calcium nitrate coagulant primer dip, a drying step, and finally dipping into the polymeric latex adhesive with fiber dispersion as in Examples 14 and 15.

| | |
|---|---|
| Carboxylated nitrile latex | 100 g |
| Ammonia | to pH 9.5 |
| EMULVIN W | 0.5 g |
| Sulfur | 0.5 g |
| ZnO | 3.0 g |
| ZDEC | 0.3 g |
| Titanium dioxide pigment | 1.0 g |
| TEGO 4710 | 0.2 g |
| ACRYSOL G 111 | 2.0 g |

The above latex was diluted with water (142.5 g), mechanically whisked to about 30% above its original volume, and adjusted to an effective viscosity for dipping. A fibrous coated foamed lining on the glove is easy and very comfortable to don and appeared to have an open-cell structure for better sweat absorption properties.

EXAMPLE 17

The following polymeric latex adhesive with fiber dispersion was prepared:

| | |
|---|---|
| Carboxylated nitrile latex | 82.5% |
| Sieved cotton flock | 10.0% |
| Rayon flock | 2.5% |
| Micronized HDPE wax | 0.8% |
| Sodium lauryl sulfate | 0.1% |
| CALSOFT L 60 | 1.0% |
| ACRYSOL G 111 thickener | 0.8% |
| Zinc oxide | 1.5% |
| Sulfur | 0.4% |
| ZDEC | 0.4% |

The above latex polymeric latex adhesive with fiber dispersion mix was diluted with water to about 35% of its total solids, whipped with a cake mixer to approximately 20% above its original volume, and adjusted to a viscosity in the range of about 1500-2000 cps for dipping. Then the procedure of Example 9 was repeated, except the elastomeric gel layer was dipped into the foamed polymeric latex adhesive with fiber mixture. When the first elastomeric gel layer was dipped into the foamed composite mix, a uniform foam gel was formed and the foam was allowed to partially dry at room temperature. The foam-coated elastomer gel was leached in warm water heated to about 40-50° C. while maintaining the water flow rate in order to provide sufficient agitation to wash away or remove a thin layer of foam bubble on the surfaces of the composite foamed gel. A uniform fibrous structure interleaved with an open-cell structure matrix was formed as the former was removed from the leach water and upon curing for about 40 minutes at about 120° C., a fine porous foam composite laminate was formed on the glove. The glove is comfortable to don and leaves the user's hand still dry after wearing the gloves for a period of 1 hour.

EXAMPLE 18

In this test, five gloves of each test batch were shaken in water to establish the amount of fiber shredded by the shaking process. The batches included 1) fiber lining coated glove according to the present invention, 2) laundered fiber lining coated glove according to the present invention and 3) flock fiber coated glove of the prior art. In this test, a first glove was placed in recessed neck container filled with about 500 milliliter of deionized or distilled water. The inside of the glove was filled with about 250 milliliter of water. Agitation was applied for about 30 second using a mechanical shaker with a speed of about 100 cycles per minute. Water containing fibers was then filtered through a clean, dried and pre-weighed 47 mm diameter crucible with 2.7 micrometer pore size glass micro fiber filter. The filter was dried in an oven at about 100±5° C. for about one hour, cooled and weighed. The mass change in the test filter was then calculated. The same test was repeated with the remaining four samples. The value reported in the Table 1 below is the average of five extraction experiments. The test was repeated with each test batch.

TABLE 1

| Glove Type | Shredded Flock Mass, mg/glove |
|---|---|
| Fiber lining coated glove according to the present invention | 3.47 |

TABLE 1-continued

| Glove Type | Shredded Flock Mass, mg/glove |
|---|---|
| Machine laundered fiber lining coated glove according to the present invention | 4.14 |
| Flock fiber coated glove of the prior art | 8.26 |

The results from Table 1 shows that the fibers are better attached to the latex layer as compared to flock fiber coated gloves of the prior art. Machine laundering does not change the damage fiber shredding properties.

FIG. 1 shows a scanning electron photomicrograph at 200× of a side view of a latex layer with fibers extending or projecting from the latex surface bonded with a polymeric latex adhesive layer in one embodiment of the present invention. The latex layer of the glove shown at 12 is approximately 8 mil (0.2 mm) thick. The thin polymeric latex adhesive layer is shown at 13 and has a thickness of approximately 1 mil (0.02 mm). The fibers that are attached to the thin polymeric latex adhesive layer are shown generally at 14. These fibers are individually separated and extend or project from the latex surface of the glove. The fibers have a length in the range 20 mil to 28 mil (0.5 to 0.7 mm). The fiber shown at 14 is attached at one tip of the fiber to the polymeric latex adhesive while the fiber shown at 15 is attached to the polymeric latex adhesive layer on both tips of the fiber.

Figure 2:
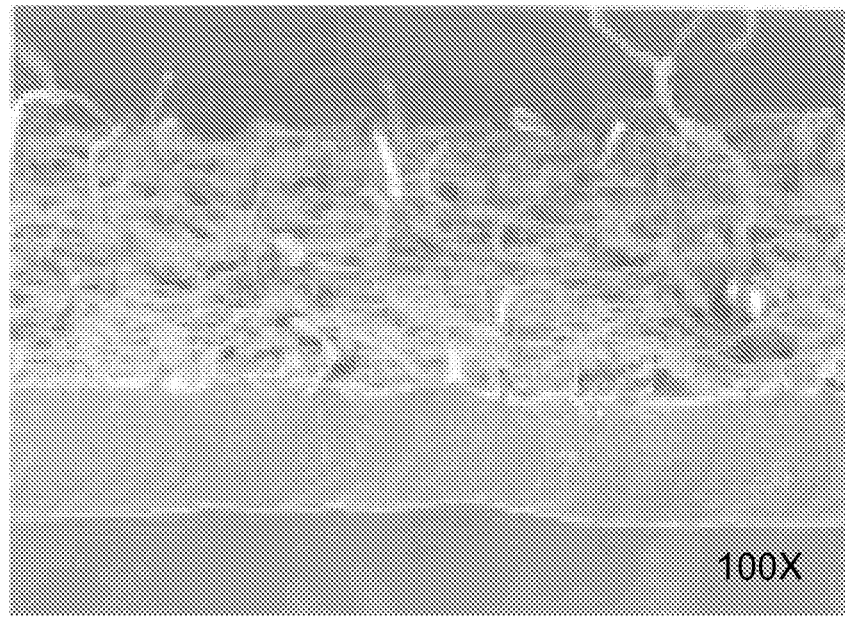
FIG. 2 shows two scanning electron photomicrographs depicting perspective view of the latex layer with fibers extending or projecting from the latex surface at 100×.
Figure 2:
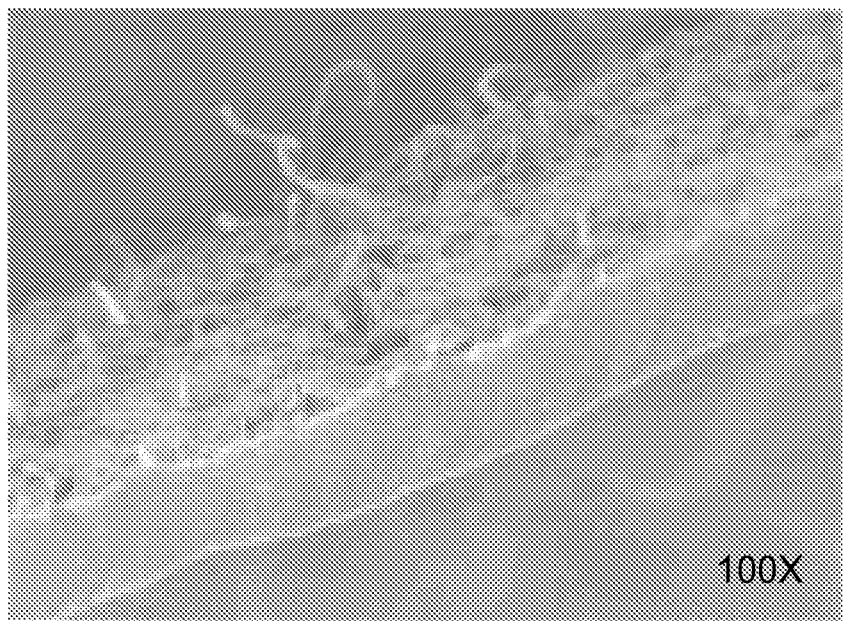

FIG. 2 shows two scanning electron photomicrographs depicting perspective view of the latex layer with fibers extending or projecting from the latex surface at 100×. The latex layer shows different contrast compared to the thin polymeric latex adhesive layer which bonds the fibers that extend or project from the latex layer. Multitudes of fibers are clearly separated from each other and extend to a significant distance from the latex layer. These fibers present a soft skin-contacting surface and provide sweat absorption creating a comfortable feel. Due to this large extension of the fibers an air gap is created between the skin and the impervious latex layer allowing air movement that results in the evaporation of sweat generated moisture.

Figure 3:
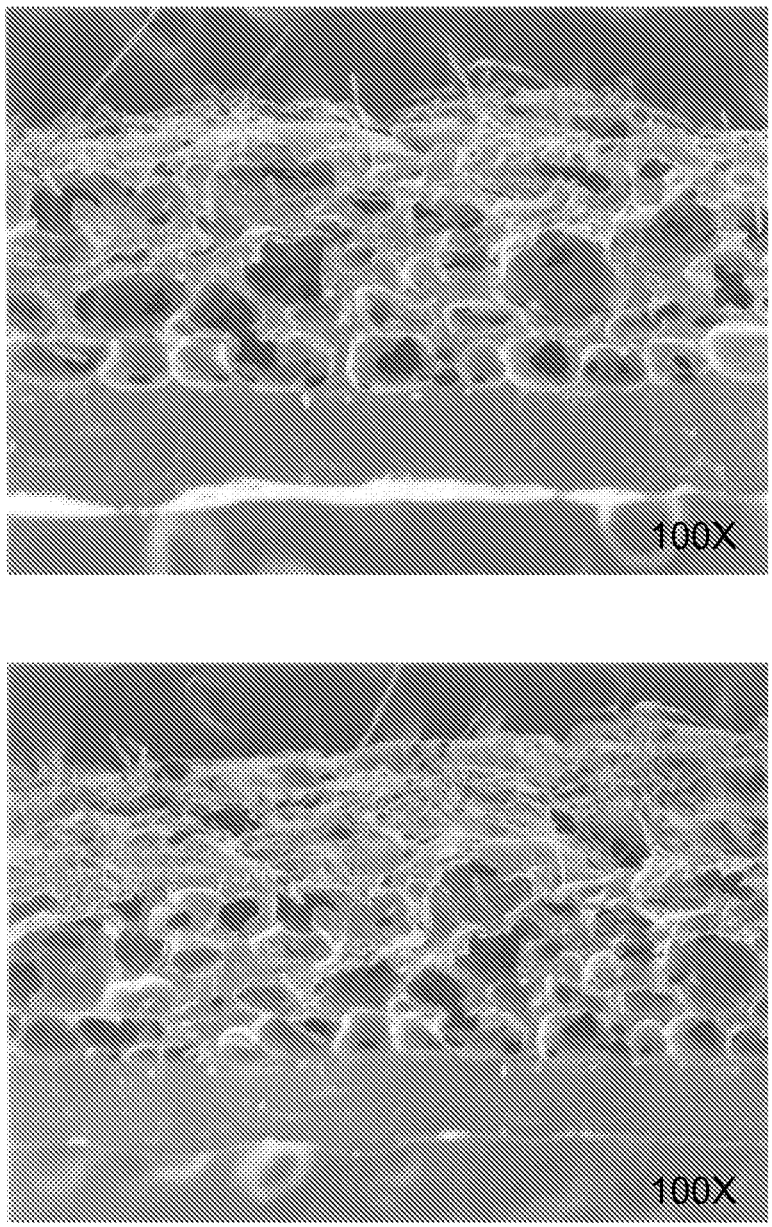
FIG. 3 shows two scanning electron photomicrographs depicting perspective view of the latex layer with fibers extending or projecting from the latex surface bonded with a foamed polymeric latex adhesive layer according to another embodiment of the present invention.

FIG. 3 shows two scanning electron photomicrographs depicting perspective view of the latex layer with fibers extending or projecting from the latex surface bonded with a foamed polymeric latex adhesive layer at 100× according to another embodiment of the present invention. The polymeric latex adhesive layer is foamed and attaches the fibers to the latex layer. Multitudes of fibers are clearly separated from each other and extend to a significant distance from the latex layer. These fibers present a soft skin-contacting surface and provide sweat absorption creating a comfortable feel. Due to this large extension of the fibers an air gap is created between the skin and the impervious latex layer allowing air movement that results in the evaporation of sweat generated moisture. The foam is open-celled and provides cushioning effect. The open cell foam also absorbs some of the sweat in the open cells.

Accordingly, one or more embodiments of the invention are directed to methods of making an elastomeric article. A former is dip-coated into a coagulant bath, which may include one or more salts. The coagulant coated former is then dipped into a first aqueous emulsion to form a first polymeric layer. The first polymeric layer is dried on the former. The former is then dipped into a second aqueous emulsion having long length fibers, thereby forming a second polymeric adhesive layer. The layers are cured to produce the final article.

The first aqueous emulsion of some aspects includes water and one or more of a polymeric latex, a cross-linking agent, a curative, a stabilizer, a viscosity modifier, a thickener and a surfactant. The second aqueous emulsion of some aspects includes one or more surfactants. A specific embodiment of the invention has the fibers in the second aqueous emulsion in the range of about 4 mil to about 78 mil (about 0.1 mm to about 2 mm) long.

The gloves of some embodiments demonstrate a shredded flock mass less than about 8 mg/glove when the glove has been tested by placement in a recessed neck container containing about 500 mL water. The glove is filled with about 250 mL water and the sample agitated for about 30 seconds at a rate of about 100 cycles/min. The water containing the fibers is then filtered through a crucible filter having a filter with a pore size of about 2.7 µm. The filter is dried at about 100° C. for about 1 hour, cooled and weighed. In detailed aspects, the glove has a shredded flock mass less than about 7, 6, 5 or 4 mg/glove. In other detailed aspects, the glove has a shredded flock mass in the range of about 1 mg/glove to about 7 mg/glove, about 1.5 mg/glove to about 6 mg/glove or about 2 mg/glove to about 5 mg/glove.

Other embodiments of the invention are directed to methods of working in a medical or industrial environment. The methods comprise wearing a glove on the hand, the glove made from a multilayer polymeric material comprising a first polymeric layer and a second polymeric. The second polymeric layer includes a plurality of fibers extending or projecting from the second polymeric layer to contact the hand.

The described invention may be varied in different ways. Therefore, it should now be apparent to a person skilled in the art that such variations may not be regarded as a deviation from the principles of the invention as described in the following claims. The various aspects and embodiments described herein can be used separately or in combination without deviating from the spirit of the invention.

What is claimed is:

1. An elastomeric article comprising:
   a first polymeric latex layer comprising a natural polymer, synthetic polymer(s), or both;
   a second polymeric latex adhesive layer bonded to the first layer and adhering a fibrous lining, the second layer and fibrous lining formed from a fibrous dispersion and the lining comprising a plurality of moisture absorbing fibers, the second polymeric latex adhesive layer comprising a natural polymer, synthetic polymer(s), or both,
   the plurality of moisture absorbing fibers having two ends, and comprising fibers wherein at least one end of which penetrates substantially the thickness of the second polymeric latex adhesive layer, wherein the fibrous lining is resistant to shedding when wet, the moisture absorbing fibers projecting from the second polymeric latex adhesive layer, and
   wherein the fibrous lining is effective to absorb and aid in evaporation of moisture.

2. The elastomeric article of claim 1, wherein the fibrous lining comprises micronized wax selected from the group consisting of synthetic wax, natural wax, and mixtures thereof.

3. The elastomeric article of claim 2, wherein the micronized wax is selected from the group consisting of carnauba wax, microcrystalline wax, paraffin wax, polyethylene wax, oxidized polyethylene wax, modified polyethylene wax, high density polyethylene wax, oxidized high density polyethylene wax, modified high density polyethylene wax, polypropylene wax, polyamide wax, polytetrafluoroethylene wax, and mixtures thereof.

4. The elastomeric article of claim 2, wherein the micronized wax is high-density polyethylene wax.

5. The elastomeric article of claim 2, wherein the micronized wax has a particle size in the range of about 3 microns to about 12 microns.

6. The elastomeric article of claim 1, wherein the first polymeric latex layer and the second polymeric latex adhesive layer are selected from the group consisting of natural rubber, synthetic polyisoprene, styrene-butadiene, carboxylated acrylonitrile-butadiene, non-carboxylated acrylonitrile-butadiene, polychloroprene, polyurethane, polyester-based polyurethane, polyether-based polyurethane, polyacrylic, butyl latex, and mixtures thereof.

7. The elastomeric article of claim 1, wherein the moisture absorbing fibers are selected from the group consisting of synthetic fibers, natural fibers, and mixtures thereof.

8. The elastomeric article of claim 1, wherein the moisture absorbing fibers are selected from the group consisting of cotton fiber, wool fiber, jute fiber, rayon fiber, polyester fiber, polyamide fiber, acrylic fiber, and mixtures thereof.

9. The elastomeric article of claim 1, wherein the first polymeric latex layer has a thickness in the range of about 0.2 to about 0.4 mm.

10. The elastomeric article of claim 1, wherein the second polymeric latex adhesive layer has a thickness in the range of about 0.02 to about 0.03 mm.

11. The elastomeric article of claim 1, wherein the moisture absorbing fibers have a denier in the range of about 1.0 to about 2.0.

12. The elastomeric article of claim 1, wherein at least one end of the fibers penetrates the second polymeric latex adhesive layer to a depth in the range of about 60% to about 100% of the thickness of the second polymeric latex adhesive layer.

13. The elastomeric article of claim 1, wherein one end of the fibers penetrate the second polymeric latex adhesive layer leaving the other end projecting from the second polymeric latex adhesive layer.

14. The elastomeric article of claim 1, wherein both ends of the fibers penetrate the second polymeric latex adhesive layer leaving the central portion of the fiber protruding from the second polymeric latex adhesive layer for sweat absorption.

15. The elastomeric article of claim 1, wherein the article is an industrial glove with a fibrous lining.

16. The elastomeric article of claim 1, wherein the article is a surgical glove with a fibrous lining.

17. The elastomeric article of claim 1, wherein the article is a glove that sheds less than about 6 mg of fiber when the glove is tested by being placed in a container with about 500 mL water and the glove is filled with about 250 mL water, the container being agitated for about 30 seconds at a rate of about 100 cycles/minute, water containing fibers is filtered through a filter having a pore size of about 2.7 μm, the filter being dried at about 100° C. for about one hour before cooling and weighing to determine the mass of fibers shed.

18. A method of making an elastomeric article according to claim 1, comprising:
  dip-coating a former into a coagulant bath;
  dip-coating the coagulant coated former in a first aqueous emulsion to form a first polymeric latex layer;
  drying the first polymeric latex layer on the former;
  dip-coating the former with the dry first polymeric latex layer in a second aqueous emulsion having moisture absorbing fibers dispersed therein to form a second polymeric adhesive latex layer; and
  curing the first polymeric latex layer and the second polymeric latex layer.

19. The method of claim 18, wherein the fibers in the second aqueous emulsion are in the range of about 4 mil to about 78 mil (about 0.1 mm to about 2 mm) long.

20. A method of working in a medical or industrial environment comprising wearing a glove on a user's hand, the glove according to claim 1.

21. The elastomeric article of claim 6, wherein the second polymeric latex adhesive layer is a polyester-based polyurethane or a polyether-based polyurethane.

22. The elastomeric article of claim 1, wherein the moisture absorbing fibers range in length from approximately 0.05 mm to 5.0 mm.

23. The elastomeric article of claim 1, wherein the fibrous lining has an overall thickness ranging from about 0.2 to about 0.5 times the thickness of the first polymeric latex layer of the elastomeric article and between about 4 to about 100 times the thickness of the second polymeric latex adhesive layer.

* * * * *